Aug. 4, 1931.  L. A. WEIL  1,817,049
STUD DRIVER
Filed March 6, 1929
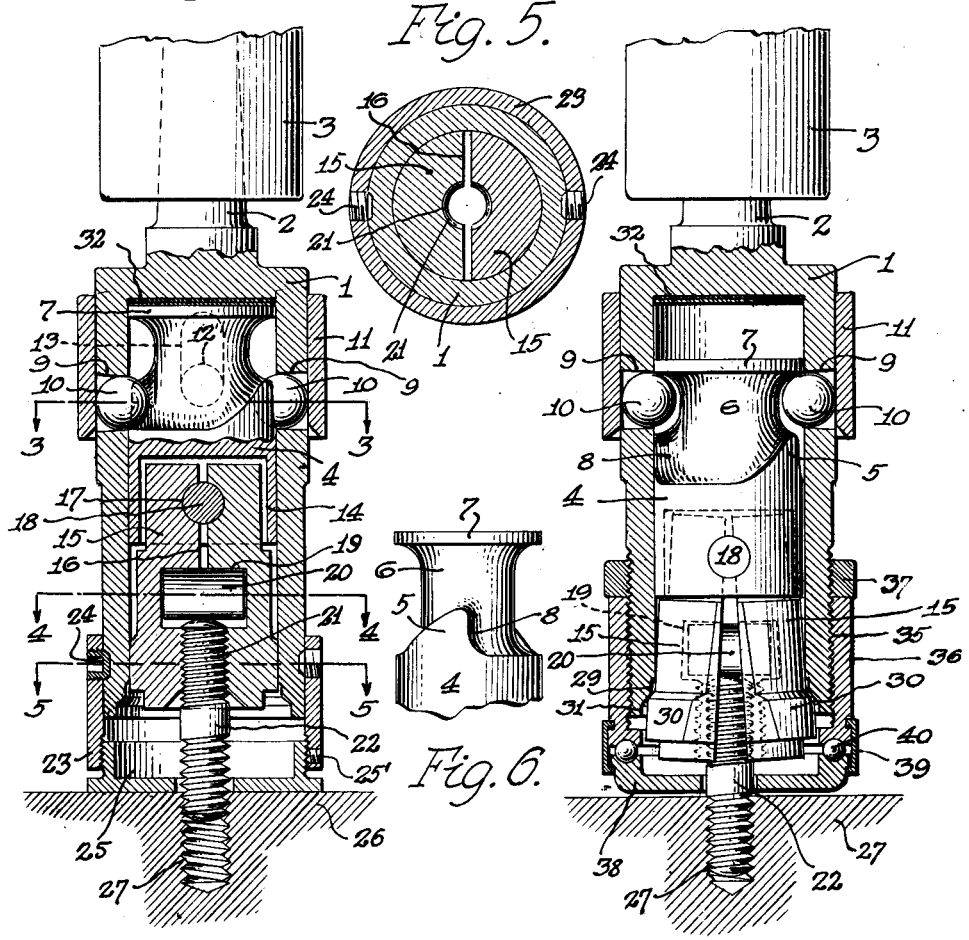
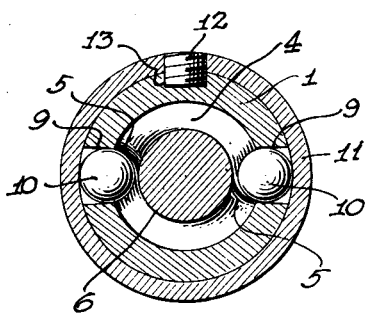
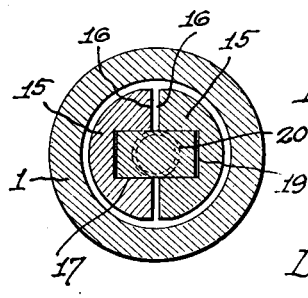
Inventor
Louis A. Weil, Patented Aug. 4, 1931

1,817,049

UNITED STATES PATENT OFFICE

LOUIS A. WEIL, OF DETROIT, MICHIGAN

STUD DRIVER

Application filed March 6, 1929. Serial No. 344,905.

The present invention pertains to a novel stud driver, and the object is to provide an improved construction of this character which overcomes the several objections of a certain driver which is now in use. Without reference to the prior art, the advantages of the novel device will be enumerated, and it will be understood that these are regarded as distinctions over the prior art.

One of the features of the novel construction is to prevent stripping the threads of the stud as often occurs through the inertia of the driving member after the stud has been driven home. The present invention involves an arrangement whereby the driving jaws are initially released from the stud just prior to the disengagement of the drive clutch. Subsequently, after the clutch is disengaged, the driving jaws are fully released from the stud.

The invention further includes an adjustable stripper which may be set according to the length of stud to be exposed above the member into which it is driven. The stripper includes a base member for engaging the body into which the stud is driven, and in order to prevent friction between the fixed body and the rotating driver, this base member is preferably rendered rotatable with respect to the driving member, with the interposition of ball bearings between these parts.

Further included in the invention is a drive clutch of such a character as to avoid adhesion or friction between the separable parts thereof when the parts are in position for release, as distinguished from a tooth clutch, for example. In this connection the stud driving body is formed at its upper end with a head adapted to rest upon a part of the clutch mechanism, so that this body will not be permitted to drop more than a predetermined distance after the clutch has been released. Also a series of washers of different thicknesses are provided for insertion between this head and the upper end of the stud driver body to compensate for wear of the clutch members.

The invention is fully disclosed by way of example in the following description and in the accompanying drawings in which—

Figure 1 is a longitudinal section of the device;

Fig. 2 is a similar section, partly in elevation, showing an advanced position of the parts and a modified form of stripper;

Figs. 3, 4 and 5 are cross sectional views on the lines 3—3, 4—4, and 5—5 respectively of Fig. 1; and Fig. 6 is a side elevation of the upper end of the carrier member.

Reference to these views will now be had by use of like characters which are employed to designate corresponding parts throughout.

In Figs. 1 and 2 the stud driver is shown as including a cylindrical body 1 having a tapered spindle 2 extending from the upper end thereof for insertion in a socket 3. Within the body 1 is contained a carrier 4 having a pair of abutments 5 formed peripherally near the upper end thereof, thereby providing a reduced portion 6 surmounted by a head 7 of substantially the diameter of the cavity of the cylindrical body. Each abutment 5 has a concave operative or clutch face 8 which functions in a manner presently to be described.

The cylindrical body 1 has a pair of diametrically opposed slots 9 formed in its wall near the upper end of the bore for the purpose of containing a pair of balls 10 adapted to engage the reduced portion 6 and also the faces 8 of the abutments as shown in Figs. 1, 2 and 3. A collar 11 surrounds the body 1 and covers the slots 9 whereby to confine the balls. The collar carries a headless set screw 12 which works in a longitudinal slot 13 formed in the outer wall of the body 1 so that the device may be disassembled for the interchanging of parts by merely raising the collar, whereby the balls 10 will fall out, and the carrier 4 and parts associated therewith may be withdrawn from the body.

In the lower end of the body is formed a cavity 14 for receiving the upper ends of a pair of stud engaging jaws 15. It will be seen that these jaws do not overlap each other to be hinged together by a pin, but are formed with flat opposed faces 16 each of which has a semi-cylindrical groove 17. The jaws are held in the carrier member by a pin 18 received in the grooves and anchored in the wall of the carrier as shown in Fig. 2 where an end of the pin appears in elevation. The opposed faces of the jaws are further recessed at 19 to receive an abutment member 20 and are finally threaded at 21 below the cavity to engage threads on the upper end of a stud 22.

To the lower end of the body 1 is secured a skirt 23 by means of socketed screws 24. On the lower end of the skirt is threaded a stripper member 25 adapted to engage the body 26, the tapped hole 27 of which is to receive the lower end of the stud. The bottom member 25 has an aperture 28 through which the stud may freely pass. It will be seen that the member 25 is adjustable longitudinally in the skirt 23 in accordance with the length of stud to remain exposed above the surface of the member 26, and this adjustment may be secured by a set screw 25' threaded through the member 23 and engageable with the threads of the member 25.

In the operation of the device as thus far described, the carrier 4 is driven by the engagement of the balls 10 against the concave faces 8 of the abutments. The upper end of the stud is held between the jaws 15 as shown in Fig. 1, and since the jaws cannot turn relatively to the stud by reason of the engagement of the abutment member 21 with the upper end of the stud, the stud is naturally screwed into the tapped hole 27. During the descent of the jaws with the stud, the carrier 4 is also brought downwardly, until finally the balls 10 can ride over the backs of the abutments 5, as shown in Fig. 2, whereupon the driving clutch may be said to be released.

It often occurs in practice that the carrier member and jaws continue to rotate by inertia even after release of the clutch, whereupon the threads of the stud or jaws are stripped. In order to overcome this difficulty, there is formed in the inner wall of the body 1, near the lower end thereof, a shallow groove 29 adapted to receive an outward shoulder 30 on the lower ends of the jaws. The parts are so positioned that the shoulders are received in the groove 29 just prior to the release of the clutch, whereupon the jaws spread slightly from the stud before the latter is fully driven home. Completion of the stud driving operation is however permitted by the engagement of the jaw threads with those on the stud, since this engagement is not entirely broken but only relieved when the shoulders enter the grooves 29. The above mentioned relation of parts is shown in Fig. 2 which illustrates the shoulders as having already passed below the groove 29 while the balls have just become disengaged from the abutments. Beneath the groove 29 is formed a deeper groove 31 which receives the shoulders immediately thereafter to permit full release of the jaws from the stud. It will also be seen that the head 7 rests on the balls 9 at this time, thus preventing withdrawal of the jaws and carrier from the body except by the means already described, which is employed only for replacement and changing the jaws for different sizes of studs.

With reference to the construction of the carrier and jaws, it will be seen that the carrier is of one piece and that the clutch mechanism for driving the same is of the rolling type, so that there is no adhesion of parts to retard disengagement of the clutch when the clutch has reached the position for disengagement. It has also been found that the absence of overlapping portions on the jaws results in more permanent alignment of the jaws.

In order to compensate for wear on the abutments 5, there is provided a series of washers 32, any one or combination of which may be inserted between the head 7 and the top of the body 1 by disassembling the device by removal of the collar 11 in the manner described. This arrangement may also be used to some extent in determining the initial position of the jaws with respect to various lengths of studs.

A modified form of stripper is shown in Fig. 2 wherein the lower end of the body 1 is threaded externally at 35 and has a skirt 36 applied thereto. A lock ring 37 screwed on the threads 35 serves to maintain the skirt 36 in the position in which it is adjusted with respect to the length of stud to remain exposed above the surface of the body 27. A stripper member 38 extends across the bottom of the skirt 36 and is held thereto by means of a channel ring 39 in which the member 38 may freely turn. Between the members 36 and 38 is inserted a series of ball bearings 40 so that the driver, including the sleeve, may turn freely with respect to the member 38. Thus, when the member 38 engages the body 27 in operation, no friction is set up between these parts in contrast to the condition which arises in the employment of the device shown in Fig. 1.

Although specific embodiments of the invention have been illustrated and described, it will be apparent that various alterations in the details of construction may be made without departing from the scope of the invention as indicated by the appended claims.

What I claim is:—

1. In a stud driver, a body adapted to be driven, a carrier rotatably and slidably mounted in said body and having abutments formed peripherally thereon at one end thereof, balls carried by the peripheral wall of said body and adapted to engage said abutments to drive said carrier, said carrier being slidable to an extent sufficient to disengage said abutments from said balls, and stud engaging means carried by said carrier.

2. In a stud driver, a body adapted to be driven, a carrier rotatably and slidably mounted in said body and having abutments formed peripherally thereon at one end thereof, balls carried by the peripheral wall of said body and adapted to engage said abutments to drive said carrier, said carrier being slidable downwardly to an extent sufficient to disengage said abutments from said balls, stud engaging means carried by said carrier and a head formed on said carrier above said balls and adapted to rest upon said balls, said head being spaced sufficiently from said abutments to accommodate said balls between said head and the highest points of said abutments.

3. In a stud driver, a body adapted to be driven, a carrier rotatably and slidably mounted in said body and having abutments formed peripherally thereon at one end thereof, balls carried by said body and adapted to engage said abutments to drive said carrier, said carrier being slidable to an extent sufficient to disengage said abutments from said balls, and stud engaging means carried by said carrier, the upper extremity of said carrier being reduced to freely receive said balls on disengagement of said abutments from said balls.

4. In a stud driver, a body adapted to be driven, a carrier rotatably and slidably mounted in said body and having abutments formed peripherally thereon at one end thereof, balls carried by said body and adapted to engage said abutments to drive said carrier, said carrier being slidable to an extent sufficient to disengage said abutments from said balls, stud engaging means carried by said carrier, the upper extremity of said carrier being reduced to freely receive said balls on disengagement of said abutments from said balls, and a head formed on the upper extremity of said carrier and adapted to rest upon said balls after disengagement of said abutments from said balls.

5. In a stud driver, a body adapted to be driven, a carrier rotatably mounted in said body, a clutch drive between said body and carrier, a head formed on the upper end of said carrier and adapted to rest upon a part of said clutch drive in the disengaged position of said clutch, and a series of washers adapted for insertion between said head and the upper end of said body.

In testimony whereof I affix my signature.

LOUIS A. WEIL.